J. STEYNIS.
PROCESS OF AND APPARATUS FOR PRODUCING OZONE.
APPLICATION FILED JAN. 29, 1913.
1,162,415.
Patented Nov. 30, 1915.
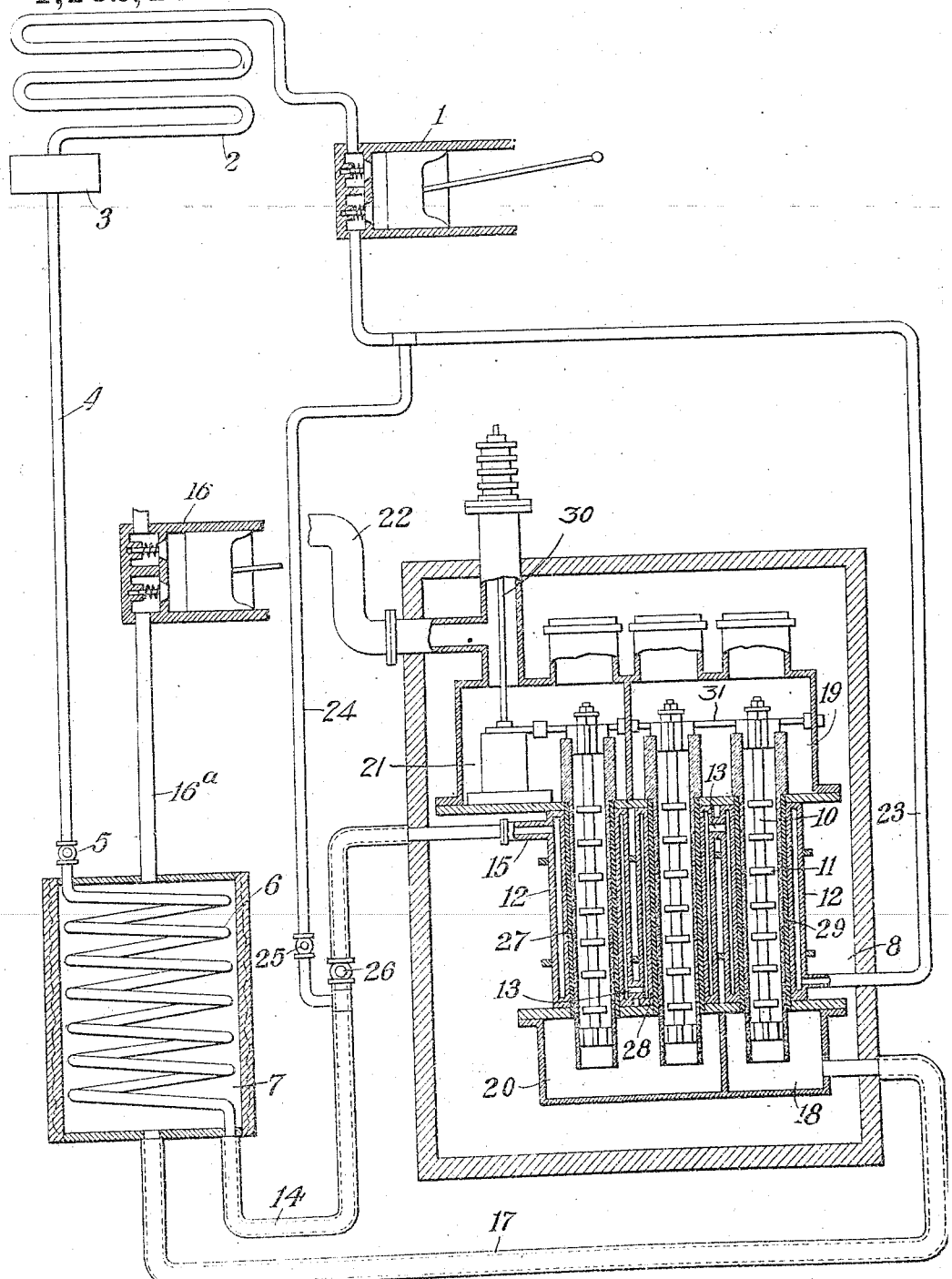

UNITED STATES PATENT OFFICE.

JAN STEYNIS, OF BAY SHORE, NEW YORK.

PROCESS OF AND APPARATUS FOR PRODUCING OZONE.

1,162,415.  Specification of Letters Patent.  Patented Nov. 30, 1915.

Application filed January 29, 1913. Serial No. 744,905.

*To all whom it may concern:*

Be it known that I, JAN STEYNIS, a subject of the Queen of the Netherlands, residing in Bay Shore, Suffolk county, State of New York, have invented or discovered certain new and useful Improvements in Processes of and Apparatus for Producing Ozone.

My invention relates to apparatus and process for producing ozone, by subjecting air successively and alternately to the action of electrical discharges and to a cooling medium.

The object of my invention is to provide apparatus for the production of ozone which will be reliable and easy to operate, and which when used in practising my improved process forming a part of this invention will give a higher concentration and a greater efficiency than has heretofore been possible with the apparatus and process heretofore used.

In practising my present invention, the air to be ozonized is first dried and cooled, by being subjected in a drying chamber to a cooling medium such as ammonia gas flowing in a closed circuit, in which closed circuit there is located a source of refrigeration or cold, such as an ammonia compressor and condenser. The air so treated is then conducted through suitable conduits into an ozone generator where it is subjected alternately and successively to electrical discharges and to the cooling action of the same cooling medium flowing in the same circuit but more remote from the source of cold. By thus conducting the cooling medium, first through the drying chamber and then through the ozone generator, I insure an even and uniform temperature in the generator slightly higher than in the drier, and thus insure against moisture being precipitated from the air in the generator, which, should it take place, would seriously interfere with the operation of the generator.

In the drawing accompanying and forming a part of this specification I have illustrated diagrammatically, apparatus embodying my improvements, and adapted to carry out my improved process.

In this drawing the numeral 1 designates an ammonia compressor which is connected with and adapted to discharge into the cooling coil 2 of the condenser 3. The compressor, cooling coil and condenser, may be of any suitable construction. The condenser 3 is connected through a pipe 4 and expansion valve 5 with the upper end of the coil 6 located in the air drying chamber 7.

The numeral 8 designates an ozone generator which may be of any approved type. A preferred type is shown and consists of a plurality of hollow electrodes 27, 28 and 29, each containing an inner electrode 10 bearing discharge rings 11. Each of the hollow electrodes is surrounded by a cooling jacket 12, and these cooling jackets are connected in series with one another by the conduits 13. The pipe 14 extends from the lower end of the cooling coil 6 to the upper end 15 of the cooling jacket 12.

Numeral 16 designates an air compressor of any approved type which delivers air through the pipe 16$^a$ into the upper end of the drier 7, from which it is conducted by pipe 17 to the compartment 18 inclosing the lower end of the hollow electrode 29. Electrodes 28 and 29 at their upper ends open into the compartment 19, and the electrodes 27 and 28 at their lower ends open into the compartment 20. The hollow electrodes are thus connected in series with one another by these compartments.

The arrangement of air pipes and conduits is such that the compressed air from the pump 16 passes through the conduit 16$^a$, through the drier 7 and conduit 17 into the chamber 18, up through the hollow electrode 29 into the chamber 19, then down through the central hollow electrode 28 into the chamber 20, up through the hollow electrode 27 at the left-hand side of the machine, and then into the chamber 21 and out of the generator through the conduit 22.

The ammonia or other cooling medium used in the system passes from the pump 1 into the cooling coils 2, where it is condensed to a liquid and descends into the condenser 3, from which it passes through the pipe 4, valve 5 and cooling coil 6 in the drier, into the cooling jacket of the electrode 27 at the left-hand side of the machine, then down through that cooling jacket and across by passage 13 to the cooling jacket of the electrode 28, then up and across through the passage 13 to the jacket surrounding the hollow electrode 29 at the right of the machine. It then passes down this jacket and leaves the generator through the pipe 23 by which it returns to the compressor 1.

A pipe 24 forming a by-pass for the cooling medium is provided extending from the pipe 14 directly to the compressor 1, and a valve 25 is provided for the purpose of opening and closing this by-pass. When the by-pass is opened, the cooling medium, after passing through the cooling coil 6 flows directly back to the compressor without passing through the ozone generator.

In operating the apparatus above described, the cooling medium is first caused to flow through the cooling coil 6 and directly back to the pump 1, in order that the drying chamber and the air therein may be thoroughly cooled and dried. The valve 25 is then closed and the valve 26 opened, so that the cooling medium after leaving the drying chamber will flow through the cooling jackets of the ozone generator, and then back to the compressor. The air from the pump 6 in passing through the drying chamber 7 is cooled and deprived of moisture held in suspension, and is then passed through the hollow electrodes in a direction reverse to that pursued by the cooling medium. In passing through these hollow electrodes it is subjected to the action of electrical discharges from the rings 11 on the electrodes 10, and to the cooling action of the cooling medium in the jackets surrounding the electrodes. After being thus treated and suitably ozonized it escapes from the apparatus through the conduit 22.

It will be observed that the cooling medium flows in a closed circuit, first passing through the drying chamber and then through the ozone generator, from which it returns to the compressor. By first causing the cooling medium to pass through the drier and then through the generator, I insure a temperature in the generator slightly higher than that in the drier, which is important for the reasons above pointed out. It is also important to maintain an even temperature throughout in the ozone generator and I have found some difficulty in doing this with machines wherein the ammonia or cooling liquid was gasified and expanded in the ozonizer. In the machine described herein since the cooling liquid is gasified in a coil located in the drier and the generator is cooled by the circulation of the cold dry gas, no liquid ammonia enters the cooling jackets around the electrodes and there is no tendency for it to collect in the jackets and cause an uneven cooling of the electrodes and of the air being treated. Should any liquid ammonia pass the coil 6 it will settle in the lower portion of the pipe 14 and will not enter the cooling jackets.

While the generator used in practising this invention may be of any approved construction, I prefer to use a generator of the general kind above described, characterized by the arrangement whereby the air in passing through the generator is subjected to the cooling action of the cooling medium and to electrical discharges successively. The generator shown is incased in a heat insulating case, and current for producing the discharges is conveyed to the electrodes by conductors 30 and 31.

Having now described my invention, what I claim is:

1. In an apparatus of the kind described, the combination of an air drier, an ozone generator, refrigerating mechanism comprising a compressor and condenser, and pipes for conveying a cooling medium from the compressor and condenser, first through the drier and then through the generator, substantially as described.

2. In an apparatus of the kind described, the combination of an air drier, an ozone generator, refrigerating mechanism comprising a compressor and condenser, and pipes for conveying a cooling medium from the compressor and condenser, first through the drier and then through the generator, and a by-pass for the cooling medium leading from the drier directly to the compressor, substantially as described.

3. In an apparatus of the kind described, an air drier, an ozone generator, means for liquefying a cooling medium, and means for conducting the cooling medium, first through the drier and then through the generator, substantially as described.

4. In an apparatus of the kind described, the combination of an air drier, an ozone generator, and refrigerating mechanism comprising means for conveying a cooling medium first through said drier and then through said generator, said means being so arranged as to prevent the cooling medium when in a liquid state from reaching said generator.

5. The process of generating ozone which consists in first subjecting the air to be ozonized to a cooling medium flowing in a closed circuit to dry the air, and then in subjecting the air to the combined action of electrical discharges and the cooling action of the same cooling medium after the cooling medium has passed through the drier, substantially as described.

JAN STEYNIS.

Witnesses:
JOHN W. PETERS,
WALTER S. JONES.